Dec. 20, 1955  S. R. JOHNSON  2,727,482
SOLDER SPLASH SHIELDING MEANS
Filed April 18, 1952  5 Sheets-Sheet 1

INVENTOR
Scott R. Johnson.
BY
ATTORNEY

INVENTOR
Scott R. Johnson.
BY Mason, Porter, Diller & Stewart
ATTORNEY

Dec. 20, 1955  S. R. JOHNSON  2,727,482
SOLDER SPLASH SHIELDING MEANS
Filed April 18, 1952  5 Sheets-Sheet 4

INVENTOR
Scott R. Johnson.
BY Mason, Porter, Diller & Stewart
ATTORNEY

Dec. 20, 1955  S. R. JOHNSON  2,727,482
SOLDER SPLASH SHIELDING MEANS
Filed April 18, 1952  5 Sheets-Sheet 5

INVENTOR
Scott R. Johnson
BY Mason, Porter, Diller & Stewart
ATTORNEY

United States Patent Office 2,727,482
Patented Dec. 20, 1955

2,727,482
SOLDER SPLASH SHIELDING MEANS

Scott R. Johnson, River Forest, Ill., assignor to Continental Can Company, Inc., New York, N. Y., a corporation of New York Application April 18, 1952, Serial No. 282,984

15 Claims. (Cl. 113—97)

The invention relates generally to the art of manufacturing cans and primarily seeks to provide novel means for shielding the open ends of the formed can bodies, as they are rapidly moved along in spaced relation in the body maker following the side seam solder bonding operation, against splashing of molten solder bits thrown off by the rapidly rotating solder wiping roll.

In the making of can bodies, body blanks are customarily shaped cylindrically about a forming horn and have their meeting edges hooked together in the form of a longitudinal side seam which is secured by a bumping pressure against said horn. Following the formation of this side seam the can bodies are rapidly fed along in longitudinally spaced relation, usually by a feeder lug equipped chain, and while being so fed the side seams are externally contacted by a soldering roll which rotates beneath the can bodies about an axis disposed parallel the line of feed. Following the solder bonding of the side seams a wiper roll rapidly rotating about a horizontal axis disposed transversely of the line of feed is contacted by the side seams of the rapidly moving can bodies for the purpose of removing excess solder. As the trailing end edge of each rapidly moving can body passes over the wiping roll, there is a tendency for the roll to throw off a spatter of molten solder bits, and these bits of solder fly into the open ends of the cans, particularly into the oncoming open end of the next succeeding can body, and adhere to the internal surfaces of the can bodies. There is also a tendency for the advance open end edges of oncoming can bodies to dig into the periphery of the rapidly rotating wiper roll, and this is objectionable because it not only results in excessive wearing of the roll, but also adds to the problem of projecting solder bits into the interiors of the can bodies.

This spattering or splashing of solder is objectionable because the solder pellets adhere to the interiors of the can bodies, often becoming detached during filling of the cans, and when adhered to lacquered or enameled internal coatings of can bodies, these hot solder bits discolor and sometimes destroy portions of the protective coatings, and corrosion sometimes results.

Much effort has been expended by workers in the art in attempts to develop practically operating shielding devices adapted to shield the spaces between can bodies, or the oncoming open ends of such bodies, against the introduction of solder bits thereinto, and, while some success has been achieved, there still remain much room for improvement of the form and manner of operation of such devices. One problem has been the accumulation of solder splash on the shielding devices themselves. Another has been the shaping of the shields and the supporting and moving thereof so that they will be effectively placed with relation to the spaces between can bodies at just the right time to shield the solder splash. Devices have been provided for scaping excess solder from the splash shields, but heretofore it has been impossible to shape and position the shields properly and yet have them in position for being effectively scraped and cleared of excess solder splash accumulation. It is a purpose of the present invention to provide a novel form of solder splash shielding means in which the shields are shaped and positioned for efficient operation, and in which shield scraping means are included which properly scrape the shields and keep them clear of solder splash accumulation.

An object of the invention is to provide a novel apparatus of the character stated including a rotor rotatable in a plane paralleling the plane in which the wiper roll rotates and having thereon and projecting laterally therefrom a plurality of equidistantly spaced solder splash shields each comprising a thin walled shield arcuate in the direction of movement of the shields with the rotor to be presented in generally concentric relation to the rotor axis and being of a length for fitting within and filling the space between two open ended can bodies travelling in line in processional order with their axes aligned and with their side seams in position for having excess solder wiped therefrom by said wiper roll, each said shield also including a downwardly and rearwardly bevelled trailing end for abutting the leading end edge of an advancing can body, and wing shoulders extending rearwardly from said bevelled end and forming supports over which said can body edge is engageable as the can body starts its movement over the wiper roll.

Another object of the invention is to provide an apparatus of the character stated wherein the solder splash shields also include upper side wing portions which are slightly flared downwardly and outwardly with relation to the wiper roll as they are passing over it, and lower side wing portions which flare in like direction as said upper portions but at a greater angle, said wings serving to gather the wiper roll sides between them as the shield is passing over the wiper roll to retain the initial shape of the roll and prevent objectionable spreading thereof.

Another object of the invention is to provide an apparatus of the character stated wherein each solder splash shield also includes side wing portions which project forwardly of the shield body proper which moves into the space between travelling cans and which are effective to gather the wiper roll periphery between the side wings in advance of the leading edge of said shield body proper, and also side wing portions which project rearwardly of the trailing end of the shield body proper, the wing projections at the trailing end of one shield being so closely spaced with relation to the wing projections at the leading end of the following shield that they will not have released their shaping or shape retaining engagement with the wiper roll by the time the oncoming leading end wing projections engage and take over the shaping or shape retaining engagement of said wiper roll.

Another object of the invention is to provide an apparatus of the character stated wherein there is included a scraper means effective to scrape solder accumulated from the interiors of the shield bodies proper and also from the side wings and their end projections.

Another object of the invention is to provide an apparatus of the character stated wherein the shield bodies proper are defined by inner and outer surfaces which bear concentric relation and normally project in a generally concentric relation to the axis of the rotor with the inner shield surface intersecting an imaginary circle struck from the rotor axis and with the leading end of said inner shield surface outward of said circle and its trailing end inwardly of said circle, said shields being shiftably mounted on the disk and means being provided for retracting each shield from its normal generally concentric shielding position to a position in which it bears concentric relation to the rotor center and holding it in the retracted position while it is engaging and being scraped clear of solder accumulation by the solder scraping means.

A further object of the invention is to provide an apparatus of the character stated wherein the shield positioning means includes a crank arm attached to each shield and rockably mounted on the rotor, stop means limiting outward projection of each shield, spring means urging the shields outwardly, a roller on each crank arm, and cam means engageable by the rollers for retracting the arms and shields.

A still further object of the invention is to provide in an apparatus of the character stated novel scraper blade mounting means comprising a swingable blade carrier, spring means constantly urging the blade carrier to effectively position the blade in its solder scraping position, stop means limiting projection of the blade at its proper scraping position, and means for adjusting the effective position of the blade.

With the above and other objects in view that will hereinafter appear, the nature of the invention will be more clearly understood by following the detailed description, the appended claims, and the several views illustrated in the accompanying drawings.

Figure 1:
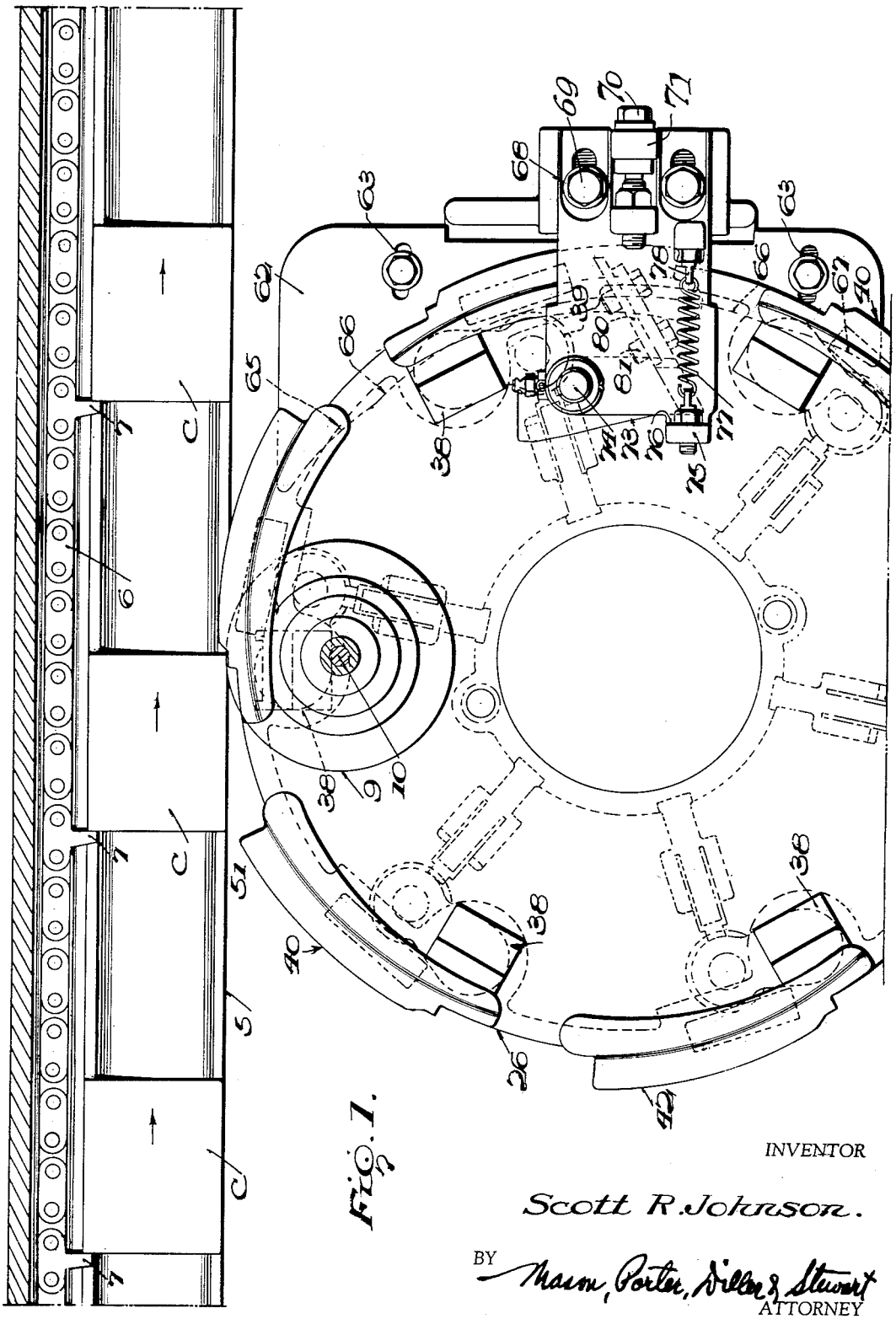
Figure 1 is an enlarged fragmentary vertical longitudinal section taken along the center of the outside horse, the conveyed cans, the solder splash shields and the rotor carrying the same being shown in side elevation.
Figure 2:
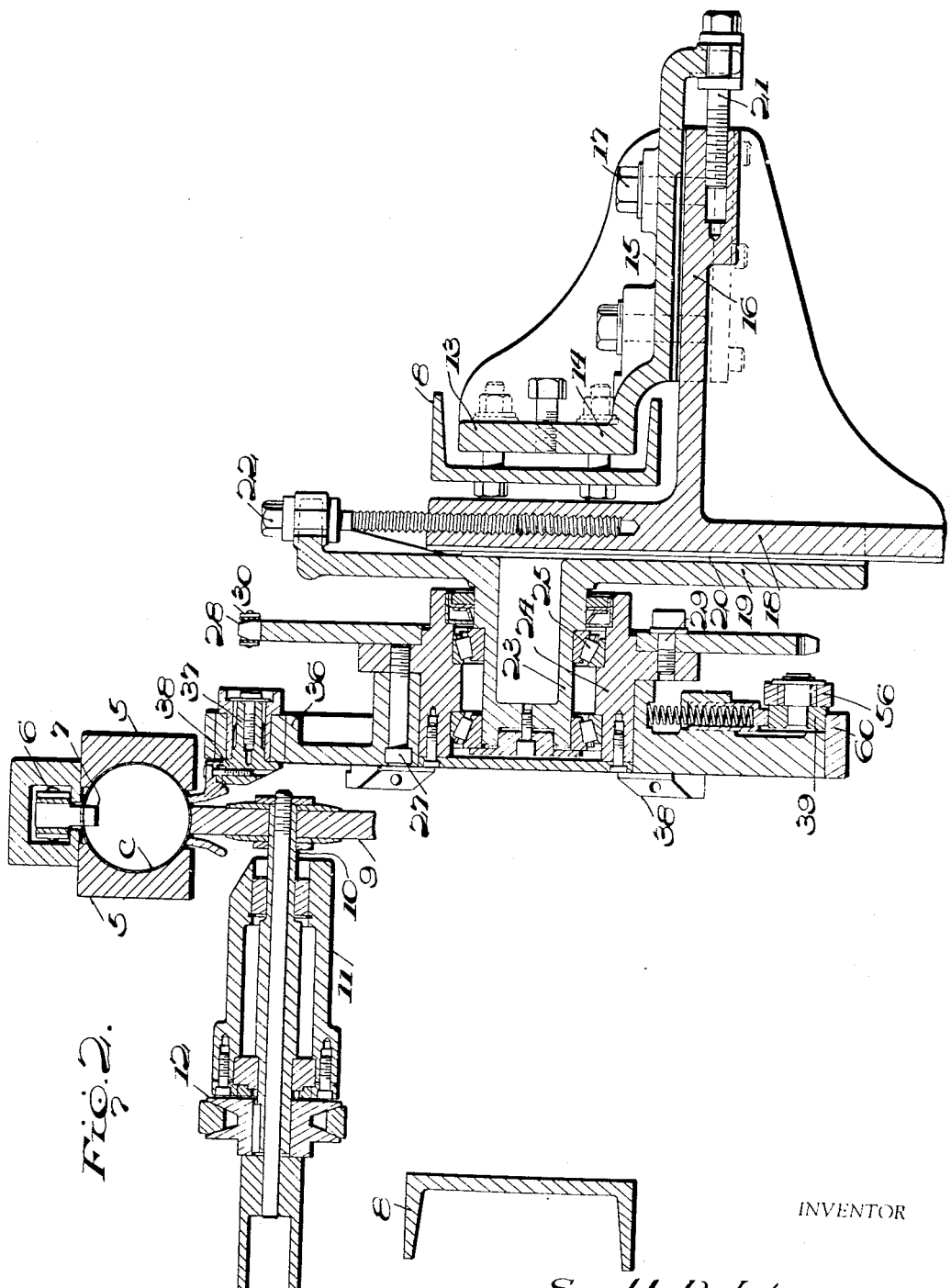
Figure 2 is a vertical cross section illustrating the parts shown in Figure 1, the section being taken through the axis of the shield carrying rotor.
Figure 3:
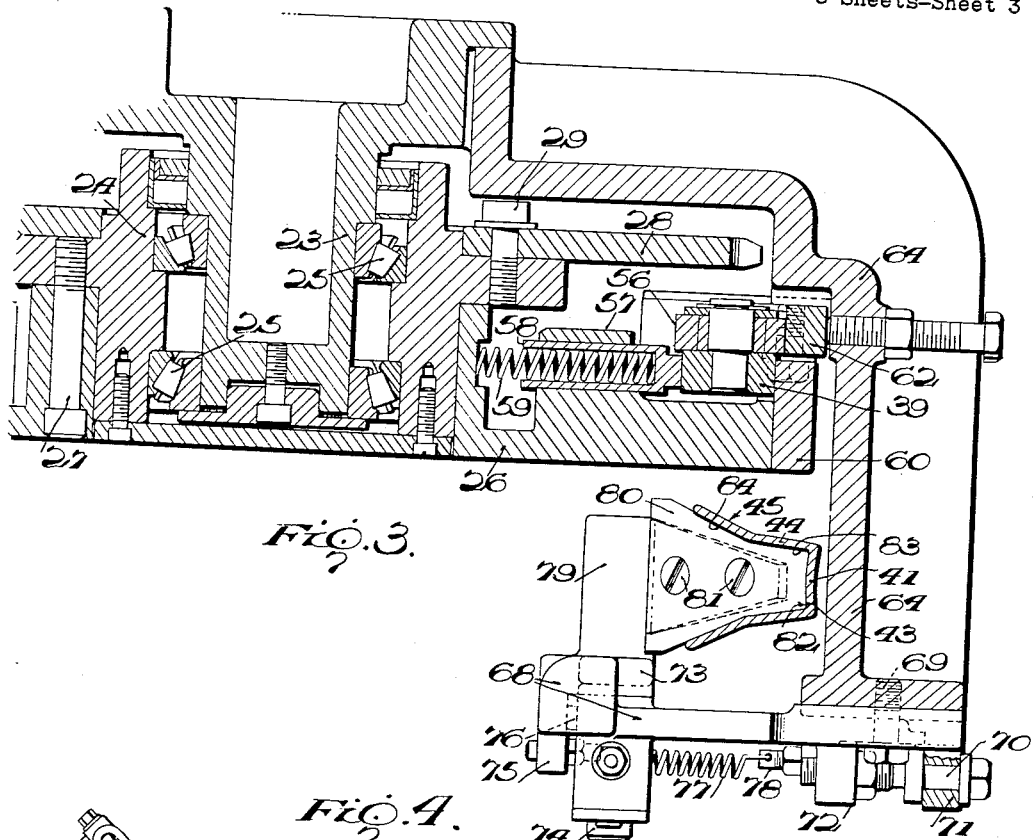
Figure 3 is an enlarged fragmentary horizontal section taken through the axis of the shield carrying rotor, the solder accumulation scraping means being shown in plan view in contact with the interior of a solder splash shield shown in cross section.
Figure 4:
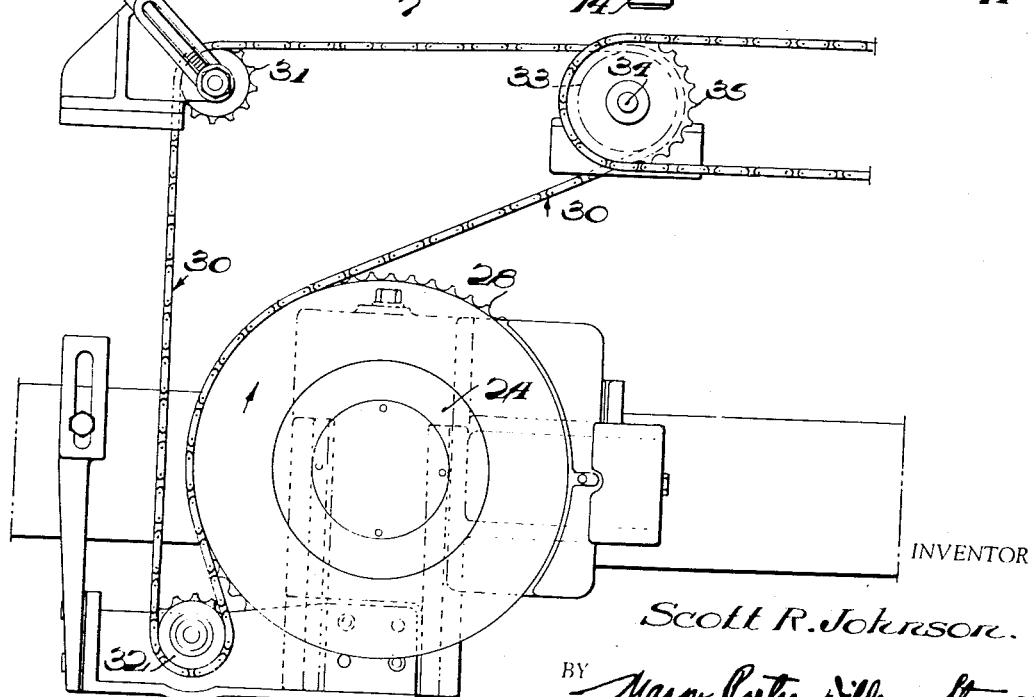
Figure 4 is a somewhat diagrammatic face view illustrating the chain drive for the shield carrying rotor, the shield carrying rotor and the solder accumulation scraping means being removed.
Figure 5:
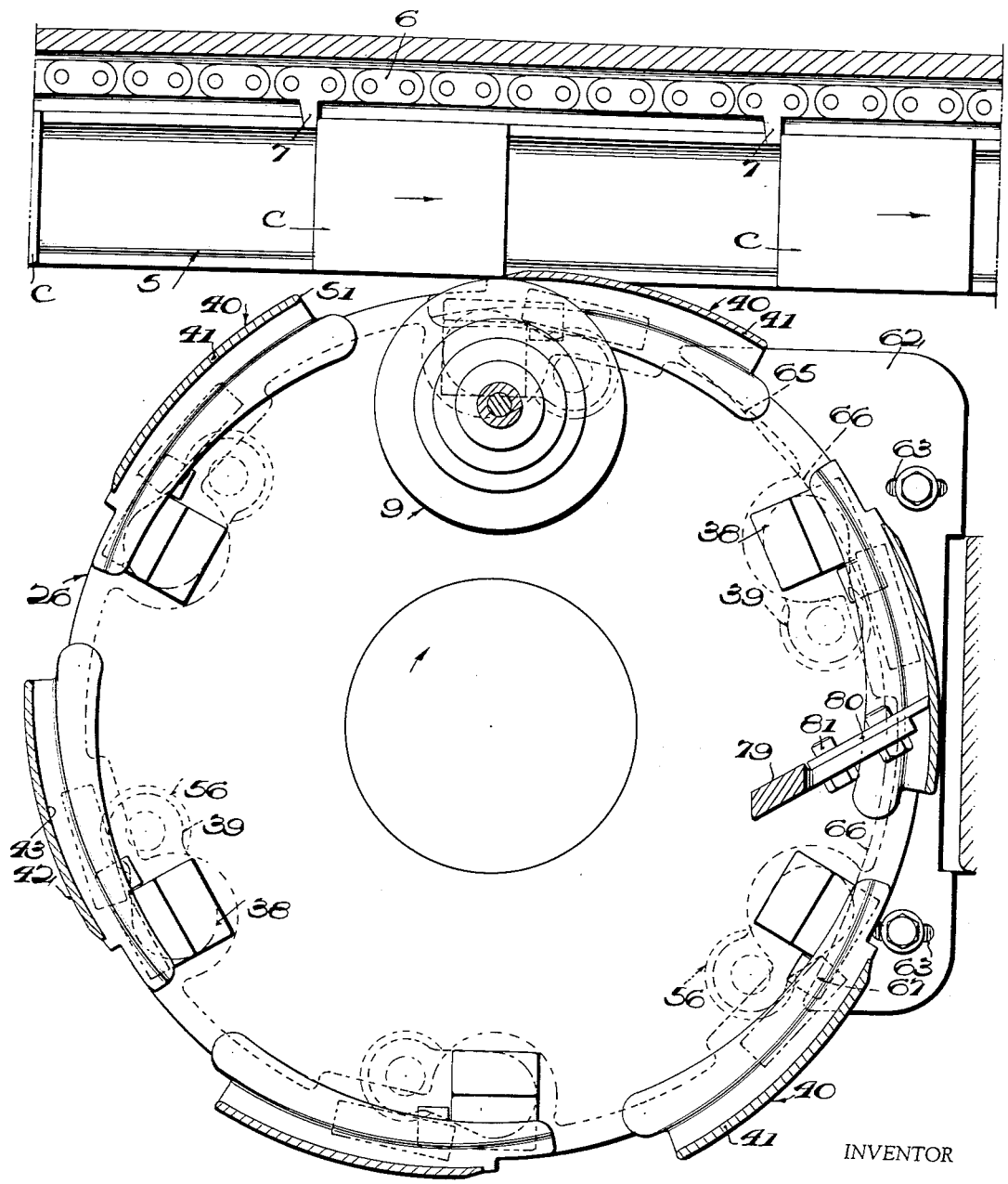
Figure 5 is a somewhat diagrammatic vertical longitudinal section in which the solder splash shields and the conveyor chain guide are shown in section, one shield being shown in its retracted position, concentric to the rotor axis and engaging the solder accumulation scraping means.
Figure 7:
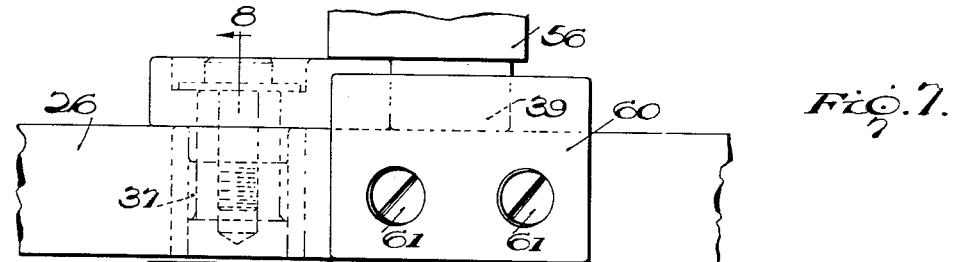
Figure 7 is a plan view of the shield shown in Figure 6.
Figure 6:
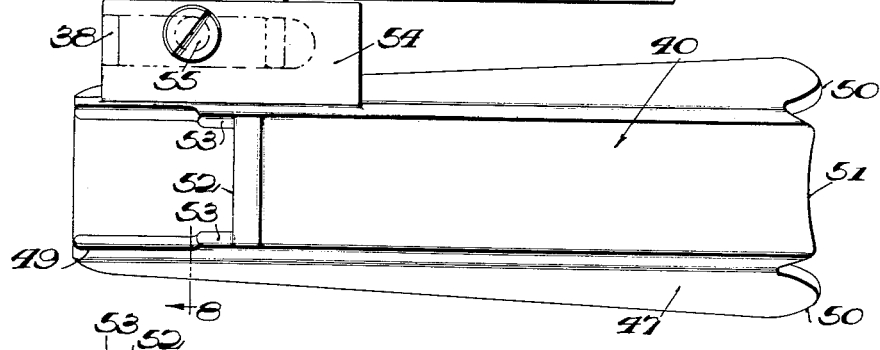
Figure 6 is an enlarged detail vertical longitudinal section through the center of one of the solder splash shields.
Figures 8, 9:
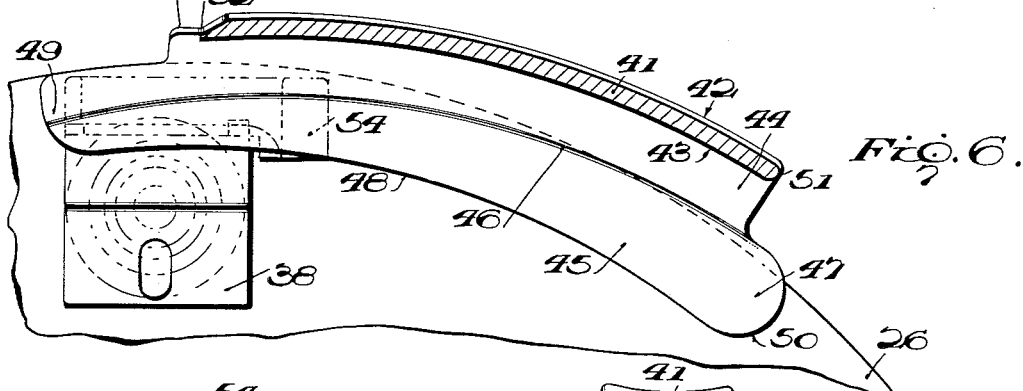
Figure 8 is a vertical cross section taken on the line 8—8 on Figure 7.
Figure 9 is a right hand end view of the shield shown in Figure 6.

In the example of embodiment of the invention disclosed herein, the usual outside horse is indicated at 5, and through this horse the cans C are conveyed by the usual lug equipped chain 6, the lugs being spaced so as to provide spaces between the travelling cans. The means for driving the chain is conventional and well known and is not specifically illustrated herein.

The usual spaced frame channels are indicated at 8 and the usual wiper roll 9 is mounted on a transverse shaft 10 which is rotatable in a suitably mounted bearing 11 and driven in any approved manner, as by a belt over the driver pulley 12.

To one of the channels 8, a bracket 13 is secured as at 14, and said bracket has a horizontally disposed extension 15 whereon a slide bracket 16 is supported and secured as at 17. The bracket 16 has an upright slideway 18 on which a bearing bracket 19 is vertically-slidably mounted as at 20. The bracket 16 is slidable longitudinally by manipulation of the captive screw 21, and the bearing bracket 19 is vertically slidable by manipulation of the captive screw 22.

A bearing extension 23 projects from the bracket 19, and a hub 24 is rotatably mounted on bearings 25 on said extension. The hub has a rotor disk 26 secured thereon, as at 27, and also a large sprocket 28, the latter being secured on the hub as at 29. The sprocket 28 may be driven in proper timed relation to the travelling cans in any approved manner, as by the chain 30 which engages the sprocket and passes over an idler sprocket 31, about a second idler sprocket 32, and about a driver sprocket 33, on a driver shaft 34 to which rotation is imparted in any approved manner, as by a suitably driven chain over the sprocket 35 also secured on the shaft 34.

The disk 26 has a plurality of bearing bosses 36 formed thereon adjacent the periphery of the disk and with their axes paralleling the axis of rotation of said disk. In this example of embodiment of the invention six such bosses are shown. Each of the bosses 36 has a hub structure 37 rockably mounted therein, and each said hub structure has a support block 38 projected therefrom at one side of the disk, and a crank arm 39 projected therefrom at the other side of the disk. On each block 38 is removably secured an arcuate solder splash shield generally designated 40. Each of the shields includes a relatively thin arcuate body shield 41 disposed to rotate in the same vertical plane as the wiper roll 9, and which is arcuate in cross section and concave at its top surface. Each body shield 41 is defined by an arcuate outer surface 42 and an arcuate inner surface 43, said surfaces bearing concentric relation to each other, and also side wings including outer slightly flared portions 44 and inner portions 45 flared at a greater angle than said outer portions from the line 46 along which the portions 44 and 45 meet. It will be noted that the meeting line 46 is concentric to the surfaces 42 and 43. The inner flared wing portions 45 are wider at the fore portions as at 47, providing inner edge extremities 48 which are eccentric to the line 46. The inner flared portions 45 also include trailing end extensions 49 and advance end extensions 50, the purpose of which will become apparent at this description progresses.

The lead end 51 of each shield is adapted to enter between spaced travelling cans at a point in close proximity to the trailing end of a can, and at its trailing end each shield is provided with a cut-off edge 52 which is downwardly and rearwardly bevelled to clear and lie real close to the advance end of the respective oncoming can C. The wings have shoulder extensions 53 on which the advance ends of oncoming cans may contact in order to assure the desired cooperative relation of the shields with the cans so as to assure that no spattering of solder can find its way from the rapidly rotating wiper roll into the open end of an oncoming can. The close proximity of the lead end 51 of each shield also assures that no solder splash can enter the trailing end of a can body.

Each solder splash shield also includes a lateral mounting lug 54 secured by screw means 55 on the respective support block 38. Each crank arm 39 has a roller 56 mounted on its free end, and radially inwardly from each roller position the disk 26 is equipped with a boss having a radial guide bore 57 for slidably receiving a hollow plunger 58 which is constantly urged outwardly against the respective crank arm by a compression spring 59 received in the respective hollow plunger and engaging inwardly against the disk hub. Each spring 59 holds the respective crank arm 39 against a limiting stop 60 which is secured as at 61 to the disk periphery and projects laterally over the crank arm but not over the roller carried thereby.

The crank arm rollers 56 are disposed to be engageable with a cam 62 which is adjustably supported as at 63 on the frame structure 64. The stationary cam 62 includes a roller and shield retracting portion 65, a dwell portion 66 which is concentric to the rotor center, and a relief portion 67. The bodies 41 of the shields which are arcuate in the direction of movement thereof with the rotor normally assume the projected position generally concentric with relation to the axis of the carrier disk or rotor. In this position the arcuate shields are disposed with their inner surfaces or walls 43 intersecting an imaginary circle struck from the axis of the rotor with the leading end of each said surface outward of said circle and the trailing end thereof inwardly of said circle and move into the spaces intervening cans being conveyed in processional order by the lug equipped chain 6 so as to prevent splashing or spattering of solder bits from the wiper roll 9 into the open ends of the travelling cans. The retracting portion 65 of the cam 62 is so shaped and arranged as to retract the shields into a position in which the inner arcuate surfaces 43 thereof bear concentric relation to the axis of rotation of the disk or rotor, and the dwell portion 66 of the cam holds the shields in this position until the rollers engage the relief portion 67 of the cam and permit the springs 59 to return the shields to their normal generally tangential relation to the periphery of the disk or rotor.

At the location of the cam dwell portion 66 a bracket 68 is adjustably secured as at 69 on the frame structure, a captive screw means 70, turnable in the frame lug 71 and threaded in the bracket lug 72 serving to impart accurate movements of adjustment to the bracket when desired. A scraper blade carrier arm 73 is pivotally suspended at 74 from the bracket 68, and said arm has a lateral extension 75 engageable with a limiting stop portion 76 of the bracket for limiting outward projection of the blade carrier arm. The extension 75 has connection with the free end of a retractile spring 77 which is anchored on the bracket 68 at 78, and constantly tends to hold the arm 73 against the stop 76, or in other words constantly tends to move the arm 73 in a direction for pressing the blade against the solder splash shields passing thereover.

The carrier arm 73 has another and opposite lateral extension 79 on which a scraper blade 80 is secured by the screws 81. The blade 80 is shaped as at 82 to conform to the shape of the inner surface 43 of each solder splash shield, at 83 to conform to the outer wing surfaces 44 of the shields and at 84 to conform to the inner wing surfaces 45 of said shields.

From the foregoing it will be apparent that as the disk or carrier is rotated the equidistantly spaced shields movable in timed relation to the travel of the cans C, will move into the spaces between the cans and completely shield the open ends of the cans against spattering of solder from the wiper roll 9 thereinto. The wings depending from the shields will serve to gather the sides of the wiper roll into the space between the wings and hold the wiper roll against objectionable spreading. The projection of the wings in advance of the main body portions 41 or shields proper as at 50 and rearwardly of said bodies proper as at 49 is of considerable importance in gathering the wiper roll sides into the space between the wings and retaining the wiper roll in this confined and shape holding position. The spaced relation of the trailing extensions or projections 49 of a given shield and the oncoming leading end extensions or projections 50 of the next shield are so spaced that the extensions 49 will not leave their contact with the wiper roll and the confinement of the roll against spreading until extensions 50 have engaged the roll and taken over the confinement of the same against objectionable spreading.

As each shield approaches the cam 62, it will be moved from its projected generally concentric relation to the axis of the disk or carrier rotor to its retracted, concentric relation to the rotor axis so that it will engage and be scraped clear of solder accumulation by the stationary blade 80. The blade will not only scrape the inner surfaces 43 of the main body portions of the shields clear of solder accumulation, but it will also similarly clear the side wing portions 44 and 45 of said shields. While the blade is accurately placed by its mounting means so that it cannot move outwardly with respect to the surfaces which it clears of solder accumulation, it is free to yield inwardly by reason of the spring mounting 77 so as to avoid any possibility of jamming.

While one example structure and arrangement of the novel structural features is disclosed herein, it is to be understood that these features can be variously modified without departing from the spirit and scope of the invention as defined in the appended claims.

I claim:

1. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including a downwardly and rearwardly bevelled trailing end for abutting the leading end edge of an advancing can body, and wing shoulders extending rearwardly from said bevelled end and forming supports over which said can body edge is engageable as the can body starts its movement over the wiper roll.

2. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including upper side wing portions which are slightly flared downwardly and outwardly considering the shield as passing over the wiper roll, and lower side wing portions which flare in like direction as said upper portions but at a greater angle, said wings serving to gather the wiper roll sides between them as the shield is passing over the wiper roll to retain the initial shape of the roll and prevent objectionable spreading thereof.

3. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including side wings which are flared downwardly and outwardly considering the shield as passing over the wiper roll, said wings serving to gather the wiper roll sides between them as the shield is passing over the wiper roll to retain the initial shape of the roll and prevent objectionable spreading thereof, said side wings including portions which project forwardly of the shield body proper which is movable into the space between travelling can and which are effective to gather the wiper roll sides between the wings in advance of the leading edge of said shield body proper, and also side wing portions which project rearwardly of the trailing end of the shield body proper, the wing projections at the trailing end of a given shield being so closely spaced with relation to the wing projections at the leading end of the following shield that they will not have released their shaping or shape retaining engagement with the wiper roll by the time the oncoming leading end wing projections engage and take over the shaping or shape retaining engagement of said wiper roll.

4. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including upper side wing portions which are slightly flared downwardly and outwardly considering the shield as passing over the wiper roll, and lower side wing portions which flare in like direction as said upper portions but at a greater angle, said wings serving to gather the wiper roll sides between them as the shield is passing over the wiper roll to retain the initial shape of the roll and prevent objectionable spreading thereof, said side wings including portions which project forwardly of the shield body proper which is movable into the space between travelling cans and which are effective to gather the wiper roll sides between the wings in advance of the leading edge of said shield body proper, and also side wing portions which project rearwardly of the trailing end of the shield body proper, the wing projections at the trailing end of a given shield being so closely spaced with relation to the wing projections at the leading end of the following shield that they will not have released their shaping or shape retaining engagement with the wiper roll by the time the oncoming leading end wing projections engage and take over the shaping or shape retaining engagement of said wiper roll.

5. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including side wings which are flared downwardly and outwardly considering the shield as passing over the wiper roll, said wings serving to gather the wiper roll sides between them as the shield is passing over the wiper roll to retain the initial shape of the roll and prevent objectionable spreading thereof, and there being included also scraper means conforming generally to the shape of inwardly directed portions of each shield and its side wings, and means for bringing about relative movement between the scraper means and the shields effective to cause the scraper means to scrape solder accumulation from the interiors of the shield bodies proper and also from the side wings.

6. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each comprising a thin walled shield of a length for fitting within and filling the space between two travelling can bodies and arcuate in the direction of movement of the shields with the rotor to be presented in generally concentric relation to the rotor axis, and means for rotating the rotor, each said shield including upper side wing portions which are slightly flared downwardly and outwardly considering the shield as passing over the wiper roll, and lower side wing portions which flare in like direction as said upper portions but at a greater angle, said wings serving to gather the wiper roll sides between them as the shield is passing over the wiper roll to retain the initial shape of the roll and prevent objectionable spreading thereof, and there being included also scraper means conforming generally to the shape of inwardly directed portions of each shield and its side wings, and means for bringing about relative movement between the scraper means and the shields effective to cause the scraper means to scrape solder accumulation from the interiors of the shield bodies proper and also from both the upper and lower side wing portions.

7. Apparatus as defined in claim 3 in which there is also included scraper means conforming generally to the shape of inwardly directed portions of each shield and its side wings, and means for bringing about relative movement between the scraper means and the shields effective to cause the scraper means to scrape solder accumulation from the interiors of the shield bodies proper and also from the side wings and their forward and rearward projections.

8. Apparatus as defined in claim 5 in which the scraper means comprises a rigid blade, and wherein there are included a swingably mounted carrier for the blade and a bracket on which the carrier is swingably mounted in position for presenting the blade in angular relation and in a direction counter to the path of movement of the shields, spring means constantly urging the carrier in a direction for effectively contacting the blade with the shields, and stop means for limiting movement of the carrier by spring action with the free end of the blade in position for contacting interiorly of the shields and the side wings thereof.

9. Apparatus as defined in claim 5 in which the scraper means comprises a rigid blade, and wherein there are included a swingably mounted carrier for the blade and a bracket on which the carrier is swingably mounted in position for presenting the blade in angular relation and in a direction counter to the path of movement of the shields, spring means constantly urging the carrier in a direction for effectively contacting the blade with the shields, and stop means for limiting movement of the carrier by spring action with the free end of the blade in position for contacting interiorly of the shields and the side wings thereof, and means for bodily adjusting the position of said bracket.

10. In apparatus of the character described, the combination of a wiper roll, means for rotating said roll, means for feeding open ended can bodies in processional order and in spaced relation with their axes aligned and with their side seams in position for having excess solder wiped therefrom by the wiper roll, a rotor rotatable in a plane paralleling the plane in which the wiper roll rotates and having thereon and projecting laterally therefrom a plurality of equidistantly spaced solder splash shields each of a length for fitting within and filling the space between two travelling can bodies, and means for rotating the rotor, each said shield being shiftably mounted on the rotor and including an arcuate inner wall, means normally effective to position the shields so as to place the inner wall of each shield in generally concentric relation to the axis of the rotor with the said inner shield wall intersecting an imaginary circle struck from the rotor axis and with the leading end of said inner shell surface outward of said circle and its trailing end inwardly of said circle as the shield is passing over the wiper roll and being swingably mounted on said rotor, and means being provided for shifting each shield from said normal generally concentric position to a position in which its inner wall bears concentric relation to the rotor axis, and scraper means for scraping solder accumulation from said inner wall while in said concentric relation.

11. Apparatus as defined in claim 10 in which each shield is mounted on a crank arm rockably supported on the rotor, and in which there are included stop means limiting outward projection of each shield, spring means urging the shields outwardly, and cam means engageable by the crank arms for retracting the arms and shields and holding them in position while the accumulation of solder is being scraped therefrom.

12. Apparatus as defined in claim 10 in which each shield is mounted on a crank arm rockably supported on the rotor, and in which there are included stop means limiting outward projection of each shield, spring means urging the shields outwardly, and cam means engageable by the crank arms for retracting the arms and shields and holding them in position while the accumulation of solder is being scraped therefrom, and wherein the scraper means comprises a rigid blade, and wherein there are included a swingably mounted carrier for the blade and a bracket on which the carrier is swingably mounted in position for presenting the blade in angular relation and in a direction counter to the path of movement of the shields, spring means constantly urging the carrier in a direction for effectively contacting the blade with the shields, and stop means for limiting movement of the carrier by spring action with the free end of the blade in a position for contacting the interiorly presented surfaces of the shields.

13. Apparatus as defined in claim 10 wherein each shield also includes side wings which are flared downwardly and outwardly considering the shield as passing over the wiper roll, said wings serving to gather the wiper roll sides between them as the shield is passing over the wiper roll to retain the initial shape of the roll and prevent objectionable spreading thereof, and said scraper means being shaped and disposed to scrape solder accumulation from said wings as well as the concentrically placed inner shield walls.

14. Apparatus as defined in claim 10 wherein each shield also includes side wings which are flared downwardly and outwardly considering the shield as passing over the wiper roll, said wings serving to gather the wiper roll sides between them as the shield is passing over the wiper roll to retain the initial shape of the roll and prevent objectionable spreading thereof, said side wings including portions which project forwardly of the shield body proper which is removable into the space between travelling cans and which are effective to gather the wiper roll sides between the wings in advance of the leading edge of said shield body proper, and also side wing portions which project rearwardly of the trailing end of the shield body proper, and said scraper means being shaped and disposed to scrape solder accumulation from said wings and their forward and rearward projections as well as the concentrically placed inner shield walls.

15. Apparatus as defined in claim 10 wherein each shield also includes side wings which are flared downwardly and outwardly considering the shield as passing over the wiper roll, said wings serving to gather the wiper roll sides between them as the shield is passing over the wiper roll to retain the initial shape of the roll and prevent objectionable spreading thereof, said side wings including portions which project forwardly of the shield body proper which is removable into the space between travelling cans and which are effective to gather the wiper roll sides between the wings in advance of the leading edge of said shield body proper, and also side wing portions which project rearwardly of the trailing end of the shield body proper, and said scraper means being shaped and disposed to scrape solder accumulation from said wings and their forward and rearward projections as well as the concentrically placed inner shield walls, and comprising a rigid blade a swingably mounted carrier for the blade and a bracket on which the carrier is swingably mounted in position for presenting the blade in angular relation and in a direction counter to the path of movement of the shields, spring means constantly urging the carrier in a direction for effectively contacting the blade with the shields, and stop means for limiting movement of the carrier by spring action with the free end of the blade in position for contacting interiorly of the shields and the side wings thereof.

References Cited in the file of this patent

UNITED STATES PATENTS 2,567,264    Winters _____ Sept. 11, 1951